June 24, 1947.    E. H. GOLDACKER    2,422,726

BOTTLE CONVEYOR

Filed Jan. 5, 1945

INVENTOR.
EDWARD H. GOLDACKER
BY John W. Michael
ATTORNEY.

Patented June 24, 1947

2,422,726

UNITED STATES PATENT OFFICE 2,422,726

BOTTLE CONVEYOR

Edward H. Goldacker, Jamaica, N. Y., assignor to Michael Yundt Company, Waukesha, Wis., a corporation of Wisconsin Application January 5, 1945, Serial No. 571,375

4 Claims. (Cl. 198—184)

1

This invention relates to improvements in bottle conveyors, and more particularly to bottle conveyors which may be adjusted to accommodate different sizes of bottles.

It is one object of the invention to provide a bottle conveyor which is quickly adjustable to the size required for conveying any one of a plurality of different sized bottles.

Another object of the invention is to provide a bottle conveyor in which the transverse dimensions may be readily varied to provide the proper size for the conveyance of different sizes of bottles in upright position.

A further object of the invention is to provide a bottle conveyor formed with an element pivotally movable into one position for guiding one size of bottle and movable into another position for guidance of a different size of bottle on the conveyor, or in which a plurality of similar elements may be used for guiding a third size of bottle, and all without affecting the operation of other portions of the conveyor.

Objects and advantages other than those above set forth will be apparent from the following description when read in connection with the accompanying drawing, in which.

Figure 1:
Fig. 1 is a top plan view showing one flight or section of a conveyor according to the present invention.
Figure 2:
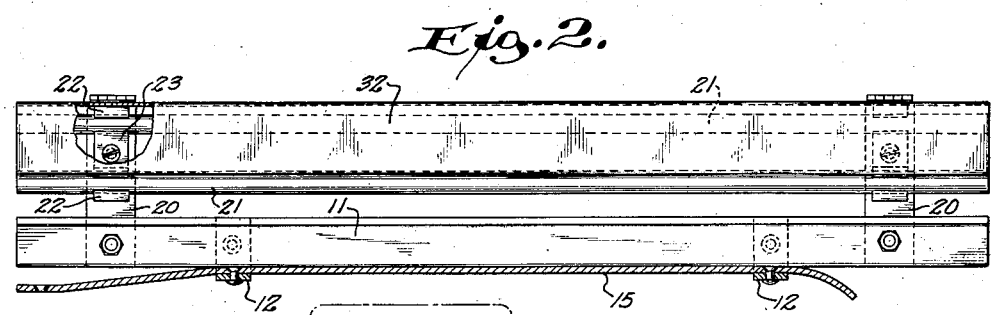
Fig. 2 is a longitudinal section taken on the plane of the line II—II of Fig. 1.

Referring more particularly to the drawing, the reference numeral 11 designates longitudinal frame members formed as angle irons and held in spaced relation by U-shaped transverse members 12. An endless chain comprising links indicated at 13 is movable in the space between the longitudinal members 11 and bears plates 14 of such size as to extend over adjacent portions of the longitudinal members. The plates are closely adjacent to each other in the longitudinal direction of the conveyor to provide substantially a continuous surface on which the bottles are carried. In the run or stretch of the chain 13, 14 carrying the bottles, the plates 14 move over the longitudinal members 11 and in the return or empty run or stretch of the chain the plates move in contact with and are supported by a slide 15 which is mounted on the transverse members 12. It will, of course, be understood that the chain 13, 14 is suitably supported and driven by sprockets mounted adjacent the ends of the longitudinal members as is well known and not shown.

2

Each of the longitudinal members 11 bears a plurality of posts 20, extending vertically upwardly from the longitudinal members, and supporting guide rails 21 shown as being half round bars with their flat surfaces held against the posts by clamping between beveled or undercut lugs 22 fixed on the posts and clamp plates 23 which also have beveled or undercut edges and are drawn toward the posts by suitable screws 24. It will be seen that the lugs 22 and plates 23 form sockets for removably holding the guide rails in place with any desired degree of rigidity.

Figure 3:
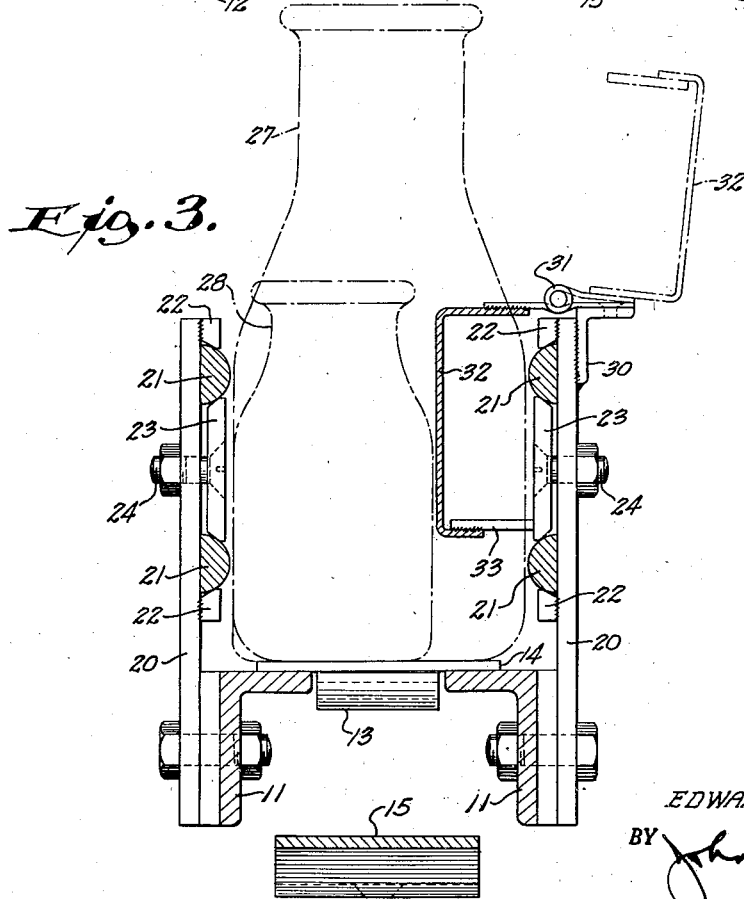
Fig. 3 is a vertical sectional view taken on the plane of the line III—III of Fig. 1.

The structure above described is so dimensioned that the size of bottles most frequently handled fit between the guide rails with only sufficient clearance to allow for ready movement of the bottles while resting on the chain. Fig. 3 shows such relationship of the parts with a larger size bottle 27 indicated in outline on which is superposed a smaller size bottle 28. It will be understood, of course, that only one section of conveyor has been illustrated and that any number of similar sections, each in itself comprising a complete conveyor, may be joined as desired.

When the conveyor is to be used for smaller sized bottles 28, it is necessary that the transverse dimensions of the conveyor, that is the dimensions between the guide rails 21, be dimensioned to allow only sufficient clearance for the small bottles upon their forward movement by the chain 13, 14. Suitable brackets 30 are severally mounted on the upper ends of certain of the posts 20 for severally receiving one leaf of hinges 31 of any suitable type but shown as being butt-strap hinges. A substantially channel-shaped guide member 32 is secured to the other leaves of the several hinges and extensions or stops 33 are fastened on the guide channel to rest on the clamp plates 23 when the guide channel is moved into the full line position shown in Fig. 3. If the conveyor is to be used for a third size and smaller bottle, a channel structure, similar to that above described, is mounted on the posts on the other side of the conveyor to provide duplicate structures along both sides of the conveyor.

When large size bottles 27 are to be handled on the conveyor, the guide channel 32 is swung upwardly into the dotted line position shown in Fig. 3. The transverse dimension of the conveyor between the guide rails 21 is then such that the bottles 27 have just the proper amount of clearance for easy movement by the conveyor chain 13, 14. However, when the smaller bottles 28 are to be handled by the conveyor, the guide channel 32 is swung to the downward position shown in full lines in Fig. 3 so that only the proper transverse spacing is provided between the guide rails 21 on one side of the conveyor and the guide channel 32 on the other side of the conveyor to receive the smaller bottles. If the conveyor is provided with duplicate guide channels along the two sides thereof, both such channels may be swung downwardly into the position for the channel shown in Fig. 3. The smallest of the three sizes of bottles may then be successfully conveyed and such bottles are centered on the chain 13, 14.

Although but one embodiment of the present invention has been illustrated and described, it will be apparent to those skilled in the art that various changes and modifications may be made therein without departing from the spirit of the invention or from the scope of the appended claims.

I claim:

1. In a conveyor for bottles of different sizes, spaced longitudinal frame members, a conveyor chain movable in the space between the frame members, guide rails mounted on each of the frame members to define a path for the movement by the chain of bottles of a larger size, and means mounted on one of the frame members and movable into the space between the frame members to reduce such space to that required for smaller sized bottles.

2. In a conveyor for bottles of different sizes, spaced longitudinal frame members, a conveyor chain movable in the space between the frame members, guide rails mounted on each of the frame members to define a path for the movement by the chain of bottles of a larger size, and a guide channel pivotally mounted on one of the frame members for swinging into the space between the frame members to reduce such space to that required for bottles of smaller size.

3. In a conveyor for bottles of different sizes, spaced longitudinal frame members, a conveyer chain movable in the space between the frame members, guide rails mounted on the frame members to define a path for the movement by the chain of bottles of a larger size, and a guide channel pivoted on the frame members along one side of the conveyor for movement into the space between the frame members to reduce such space to the cross sectional area required for bottles of smaller size.

4. In a conveyor for bottles of different sizes, spaced longitudinal frame members, a conveyor chain movable in the space between the frame members, posts mounted on the frame members and extending upwardly therefrom, guide rails mounted on the posts and extending along the longitudinal axis of the conveyor, the chain and the guide rails defining a path for the movement of a larger size bottle, and a guide channel mounted on a number of the posts for movement into the space between the guide rails to reduce the space therebetween to that forming a path for the movement of a smaller bottle.

EDWARD H. GOLDACKER.

REFERENCES CITED

The following references are of record in the file of this patent:

UNITED STATES PATENTS

| Number | Name | Date |
| --- | --- | --- |
| 2,156,020 | Lathrop | Apr. 25, 1939 |
| 2,369,557 | Gettelman | Feb. 13, 1945 |
| 635,177 | McCabe | Oct. 17, 1899 |
| 752,341 | Hopkins et al. | Feb. 16, 1904 |